(12) United States Patent
Park et al.

(10) Patent No.: US 12,374,850 B2
(45) Date of Patent: Jul. 29, 2025

(54) HIGH-EFFICIENCY AND DIRECTIONAL NON-RESONANT LASER USING SCATTERING CAVITY AND METHOD OF MANUFACTURING THE SAME

(71) Applicant: Korea Advanced Institute of Science and Technology, Daejeon (KR)

(72) Inventors: Yongkeun Park, Daejeon (KR); Kyeoreh Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 873 days.

(21) Appl. No.: 17/626,122

(22) PCT Filed: Dec. 3, 2021

(86) PCT No.: PCT/KR2021/018258
§ 371 (c)(1),
(2) Date: Jan. 10, 2022

(87) PCT Pub. No.: WO2022/131643
PCT Pub. Date: Jun. 23, 2022

(65) Prior Publication Data
US 2023/0268708 A1    Aug. 24, 2023

(30) Foreign Application Priority Data

Dec. 18, 2020   (KR) .................. 10-2020-0178619
Mar. 15, 2021   (KR) .................. 10-2021-0033478

(51) Int. Cl.
H01S 3/094    (2006.01)
H01S 3/05    (2006.01)
(Continued)

(52) U.S. Cl.
CPC .......... *H01S 3/094084* (2013.01); *H01S 3/05* (2013.01); *H01S 3/0602* (2013.01);
(Continued)

(58) Field of Classification Search
CPC .... H01S 3/094084; H01S 3/05; H01S 3/0602; H01S 3/08; H01S 3/1685; H01S 3/30; H01S 3/08086; H01S 3/0627
See application file for complete search history.

(56) References Cited

U.S. PATENT DOCUMENTS 5,448,582 A * 9/1995 Lawandy ............... G01N 21/63
                                                372/39
9,246,300 B2    1/2016 LaComb
(Continued)

FOREIGN PATENT DOCUMENTS

CN          1061787 C  *  2/2001  ............. H01S 3/14
JP          05-243646      9/1993
(Continued)

OTHER PUBLICATIONS

Choubey Priyanka S et al., "Whispering Gallery Mode Assisted Random Lasing in dye-doped PVA coated silica microsphere", proceedings of SPIE; vol. 10687, May 21, 2018, pp. 106871a-106871a.

(Continued)

*Primary Examiner* — Yuanda Zhang
(74) *Attorney, Agent, or Firm* — Christensen O'Connor Johnson Kindness PLLC

(57) ABSTRACT

Various embodiments provide a high-efficiency and directional non-resonant laser using a scattering cavity and a method of manufacturing the same. According to various embodiments, the non-resonant laser may include a gain medium unit in which a scattering cavity and an entrance communicating with the scattering cavity are provided, and a pumping and supply unit configured to supply pumping light to an inside of the scattering cavity. The gain medium unit may be implemented to be excited by the pumping light on the inside of the scattering cavity and to output emission light through the entrance. According to various embodi- (Continued)

ments, the gain medium unit may weaken the pumping light while reflecting the pumping light on the inside of the scattering cavity, and may amplify the emission light while reflecting the emission light on the inside of the scattering cavity.

18 Claims, 5 Drawing Sheets

(51) Int. Cl.
 H01S 3/06 (2006.01)
 H01S 3/08 (2023.01)
 H01S 3/16 (2006.01)
 H01S 3/30 (2006.01)
(52) U.S. Cl.
 CPC .............. *H01S 3/08* (2013.01); *H01S 3/1685* (2013.01); *H01S 3/30* (2013.01)

(56) References Cited

U.S. PATENT DOCUMENTS

2003/0165174 A1* 9/2003 Lawandy ................. H01S 3/30
 372/53
2013/0322475 A1* 12/2013 LaComb ................... H01S 3/08
 372/99

FOREIGN PATENT DOCUMENTS

| JP | 2001-332810 | 11/2001 |
| JP | 2007-227406 | 10/2011 |
| KR | 10-0348174 | 8/2002 |
| KR | 10-2011-0125804 | 11/2011 |
| WO | 0167565 A1 | 9/2001 |

OTHER PUBLICATIONS

Hui cao et al., "Complex Lasers with Controllable Coherence", arxiv. org, Cornell University Library, 201OLIN Library Cornell University Ithaca, NY 14853, Jul. 31, 2018.

Michael T. Cone et al., "Diffuse reflecting material for integrating cavity spectroscopy, including ring-down spectroscopy", Applied Optics, Optical Society of America, Washington DC, US, vol. 54, No. 2, Jan. 10, 2015, pp. 334-346.

Chulmin Oh et al., "Non-resonant lasing in a deep-hole scattering cavity", arxiv. org, Cornell University Library, 201 OLIN Library Cornell University Ithaca, NY 14853, Sep. 13, 2022.

* cited by examiner

100

HIGH-EFFICIENCY AND DIRECTIONAL NON-RESONANT LASER USING SCATTERING CAVITY AND METHOD OF MANUFACTURING THE SAME

CROSS-REFERENCES TO RELATED APPLICATIONS

This application is based on and claims priority under 35 U.S.C. 119 to Korean Patent Application Nos. 10-2020-0178619, filed on Dec. 18, 2020, and 10-2021-0033478, filed on Mar. 15, 2021 in the Korean intellectual property office, the disclosures of each of which are herein incorporated by reference in their entireties.

TECHNICAL FIELD

Various embodiments relate to a high-efficiency and directional non-resonant laser using a scattering cavity and a method of manufacturing the same.

BACKGROUND OF THE DISCLOSURE

A common laser has a structure in which a resonator is constructed using a mirror, etc. in order to greatly amplify light. However, in a gain medium of the common layer based on the resonator, the type of gain medium which may be used is limited because the gain medium operates only in a transparent material. Accordingly, an available laser wavelength and a characteristic are limited.

Unlike a laser using a resonator, a non-resonant laser is a laser using non-resonance feedback. In general, non-resonance feedback is obtained by adding a scatterer to the inside of a laser resonator. Many optical paths are provided to the inside of a cavity so that light does not construct a closed path until the light exits to the outside of the cavity. The greatest advantage of the non-resonant laser is that an opaque amplification medium can be used. Accordingly, a gain material having a powder, film, or ceramic form which could not be used in the existing laser can be used. This may greatly help the development of a laser in a new wavelength, such as an ultraviolet ray (UV) or terahertz (THz) region. Furthermore, in the case of the existing gain medium, if a laser can be constructed without a crystallization process, many effects in terms of economics may be expected.

Nevertheless, the reason why a non-resonant laser is not used is a scatterer added in order to construct non-resonance feedback. In many cases, a scatterer within a cavity experiences a very great light loss because the scatter directly delivers light even to the outside of the cavity. Accordingly, many non-resonant lasers have very low energy efficiency. Furthermore, most of scatterers diffuse the direction of progress of light in all directions. For this reason, in many cases, oscillating light has very low spatial coherence. High directionality attributable to the high spatial coherence is one of the greatest reasons that a laser cannot be substituted with other light sources. Accordingly, a non-resonant laser may be substituted with the existing incoherent light source, such as an LED or a lamp, except a very special situation. Accordingly, the application of the non-resonant laser is extremely limited.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

As described above, a non-resonant laser has many advantages because the non-resonant laser permits various architectures and gain media, but an application thereof is limited because directionality and efficiency are low. Various embodiments propose a non-resonant laser capable of achieving efficient directionality emission by constructing a cavity in which light can be effectively contained and through a construction for adding a gain medium to the cavity, and a method of manufacturing the same.

Various embodiments provide a high-efficiency and directional non-resonant laser using a scattering cavity and a method of manufacturing the same.

According to various embodiments, a high-efficiency and directional non-resonant laser may include a gain medium unit in which a scattering cavity and an entrance communicating with the scattering cavity are provided, and a pumping and supply unit configured to supply pumping light to an inside of the scattering cavity. The gain medium unit may be excited by the pumping light on the inside of the scattering cavity, and may output emission light through the entrance.

According to various embodiments, a method of manufacturing a non-resonant laser may include preparing the gain medium unit in which the scattering cavity and the entrance are provided, and combining the gain medium unit and the pumping and supply unit.

According to various embodiments, the non-resonant laser can be implemented to have high efficiency and directionality by using the scattering cavity. Accordingly, the non-resonant laser can solve fatal disadvantages of the existing non-resonant laser, that is, low energy efficiency and low light directionality. According to various embodiments, it is expected that a laser in a new band can be manufactured by using scattering gain media which cannot be used as a laser due to difficult manufacturing in a transparent form. Furthermore, even in the case of the existing scattering gain media, the present disclosure may be used as a technology capable of improving performance of the existing laser in terms that a laser can be easily manufactured even without a difficult crystallization process.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

Figure 1:
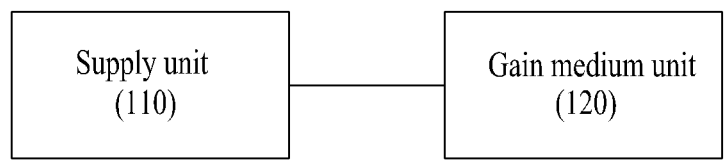
FIG. 1 is a block diagram illustrating a high-efficiency and directional non-resonant laser according to various embodiments.
Figure 2:
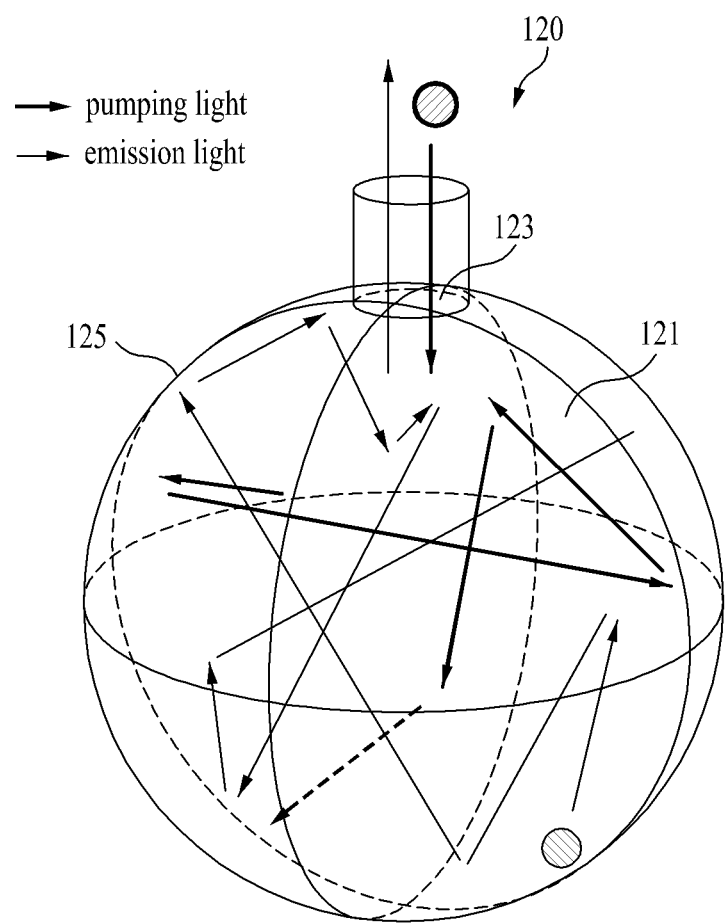
FIGS. 2 and 3 are schematic diagrams illustrating a gain medium unit of FIG. 1.
Figure 3:
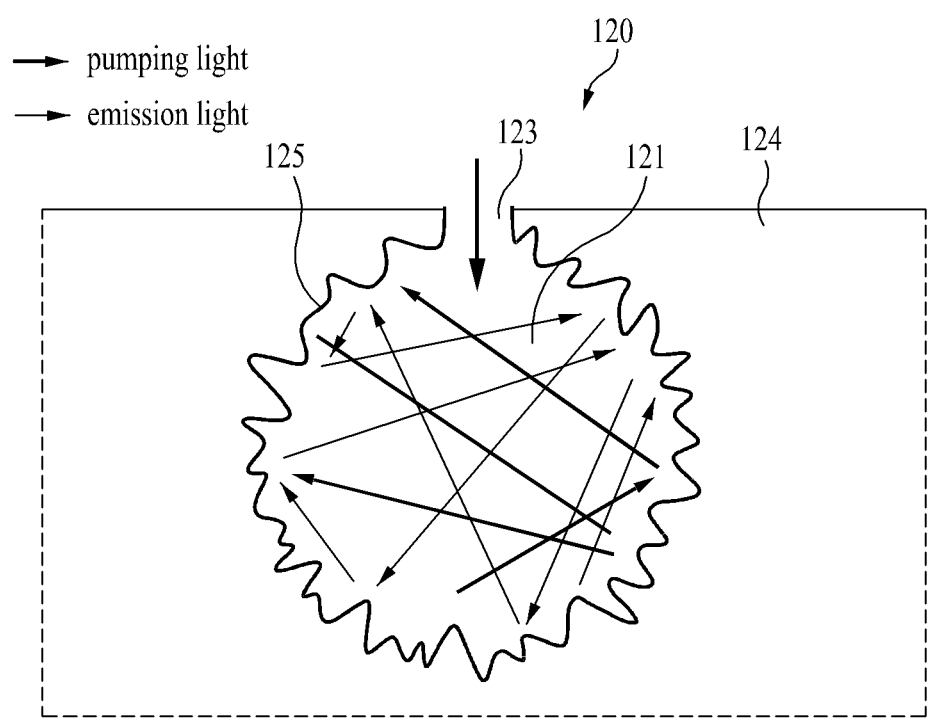
Figure 4:
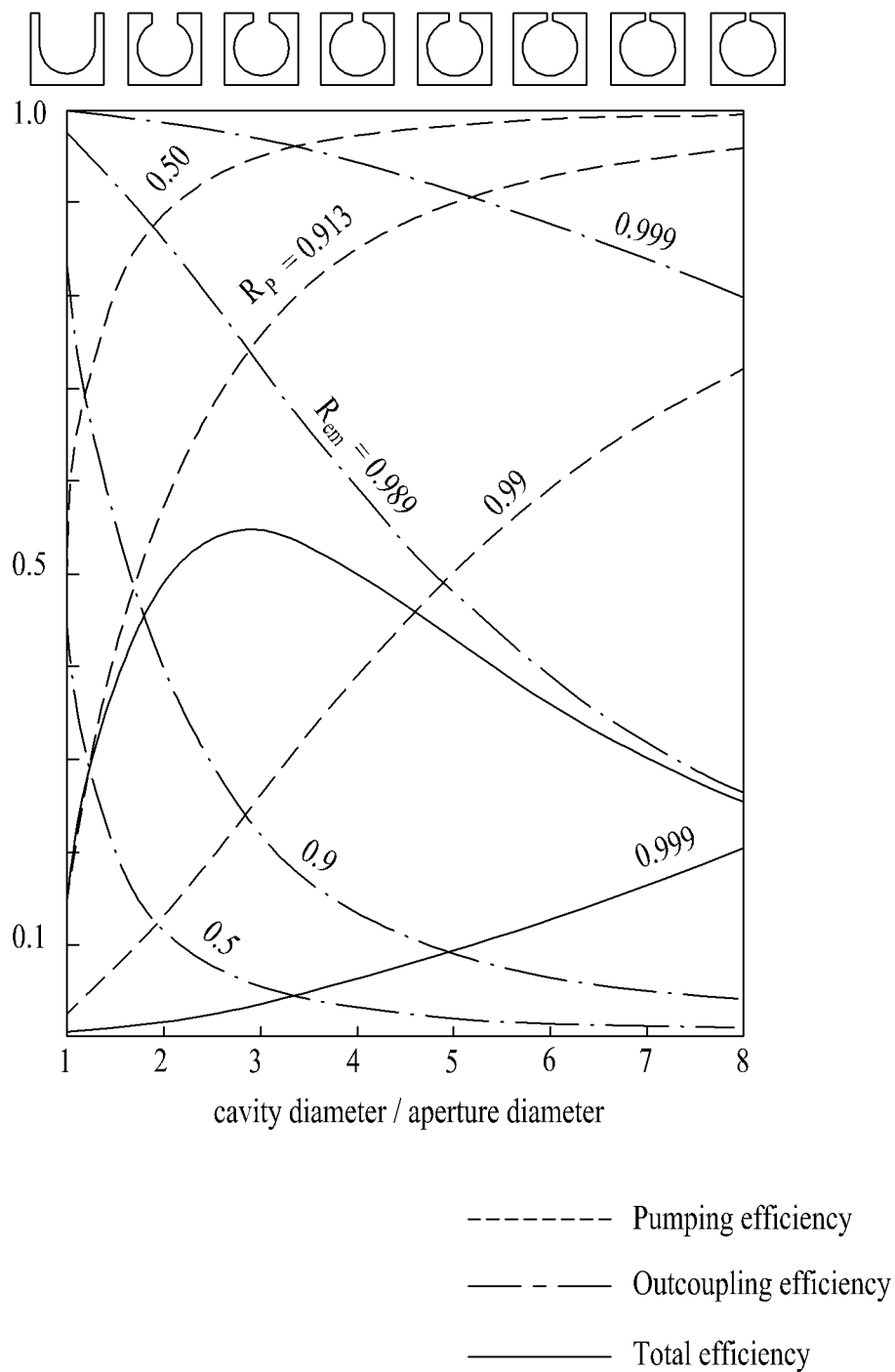
FIG. 4 is a diagram for describing a scattering cavity implementation according to energy efficiency of the gain medium unit of FIG. 1.

FIG. 1 is a block diagram illustrating a high-efficiency and directional non-resonant laser 100 according to various embodiments. FIGS. 2 and 3 are schematic diagrams illustrating a gain medium unit 120 of FIG. 1. FIG. 4 is a diagram for describing an implementation of a scattering cavity 121 according to energy efficiency of the gain medium unit 120 of FIG. 1.

Referring to FIGS. 1, 2 and 3, the non-resonant laser 100 according to various embodiments may include a pumping and supply unit 110 and the gain medium unit 120. In some embodiments, at least another element may be added to the non-resonant laser 100.

The pumping and supply unit 110 may supply pumping light. According to an embodiment, the pumping and supply unit 110 may supply the pumping light on the outside of the gain medium unit 120. In this case, the pumping and supply unit 110 may supply the pumping light to the inside of the scattering cavity 121 through the entrance 123. According to another embodiment, the pumping and supply unit 110 may supply the pumping light on the inside of the gain medium unit 120. For example, the pumping and supply unit 110 may generate the pumping light by using at least one electrical energy or chemical energy.

The scattering cavity 121 and an entrance 123 communicating with the scattering cavity 121 may be provided in the gain medium unit 120. The scattering cavity 121 has been conceived the existing fish trap, and may have a form having a wide space appearing behind the relatively narrow entrance 123. In this case, the scattering cavity 121 may have any one of a spherical shape, an ellipsoid, a crushed spherical shape, a crushed ellipsoid, a cylindrical shape, or a tilted cylindrical shape. In this case, a cross section of at least one of the scattering cavity 121 and the entrance 123 may be a circle, an oval shape, a crushed circle, a crushed oval shape, or a polygon. According to an embodiment, the diameter of the entrance 123 and the diameter of the scattering cavity 121 may be defined on planes perpendicular to an axis that passes through the center of the entrance 123 and the center of the scattering cavity 121. For example, the diameter of the scattering cavity 121 may be increased as the scattering cavity 121 becomes distant from the entrance along the axis that passes through the center of the entrance 123 and the center of the scattering cavity 121. For example, if the scattering cavity 121 is a spherical shape, the diameter of the scattering cavity 121 may be a maximum on a center plane perpendicular to the axis at the center of the scattering cavity 121, and may be small as the scattering cavity 121 becomes distant from the center plane in a direction becoming distant from the entrance 123 along the axis. According to another embodiment, if the scattering cavity 121 is a cylindrical shape, the depth of the scattering cavity 121 may be defined along an axis perpendicular to the diameter of the scattering cavity 121. For example, the depth of the scattering cavity 121 may be twice greater than and ten times or less than the diameter of the scattering cavity 121. According to another embodiment, if the scattering cavity 121 is a tilted cylindrical shape, an inner surface of the scattering cavity 121 in the gain medium unit 120 may be sloped from the axis perpendicular to the diameter of the scattering cavity 121.

The gain medium unit 120 may be implemented to be excited by pumping light on the inside of the scattering cavity 121 and to output emission light through the entrance 123. In this case, the gain medium unit 120 may be implemented to have an internal wall surface of the scattering cavity 121 formed of a scattering gain medium 125, so that the focusing of the pumping light and the amplification of the emission light through high reflectance can be simultaneously achieved. A form of the scattering cavity 121 may differently operate with respect to the pumping light and the emission light.

In the case of pumping light, the scattering cavity 121 may operate in a very similar way as a fish trap. In such a case, the gain medium unit 120 may weaken the pumping light while reflecting the pumping light on the inside of the scattering cavity 121. Due to a form of the scattering cavity 121, the probability that the pumping light will exit through the narrow entrance 123 may be very low. In some embodiments, the pumping and supply unit 110 may supply the pumping light from the outside of the gain medium unit 120 to the inside of the scattering cavity 121. The probability that the pumping light focused on the entrance 123 and entering the inside of the scattering cavity 121 will return and exit through the narrow entrance 123 will be very low as an internal space of the scattering cavity 121 is widened. The scattering gain medium 125 that forms the internal wall surface of the scattering cavity 121 absorbs the pumping light, and thus the pumping light may have its energy lost as reflection from the wall surface of the scattering cavity 121 proceeds. As a result, most of the energy may be wholly delivered to the scattering gain medium 125.

In the case of emission light, the gain medium unit 120 may amplify the emission light while reflecting the emission light on the inside of the scattering cavity 121. Due to a form of the scattering cavity 121, the probability that the emission light will exit through the narrow entrance 123 is low as in the case of pumping light. However, unlike the pumping light, the emission light continues to be amplified by the scattering gain medium 125 whenever reflection from the internal wall surface of the scattering cavity 121 proceeds, and thus intensity thereof is increased. As a result, the emission light is amplified on the inside of the scattering cavity 121 until the moment when the amount of generated light becomes identical with the amount of light that exits through the narrow entrance 123. This may mean that the entire light energy generated as a result is emitted through the narrow entrance 123.

As described above, a form of the scattering cavity 121 in the gain medium unit 120 can simultaneously achieve high pumping efficiency and a low cavity loss. Accordingly, the non-resonant laser 100 according to various embodiments can achieve high-level energy efficiency compared to a common laser not to mention the existing non-resonant laser. Accordingly, laser light may be oscillated from the gain medium unit 120 to the outside. In this case, laser light having various wavelengths may be oscillated based on a combination of pumping light and the scattering gain medium 125 of the gain medium unit 120. For example, laser light in a visible ray region, an ultraviolet ray region, an infrared region, a terahertz region, or a microwave region may be oscillated.

According to various embodiments, a direction and spatial coherence degree of laser light oscillated from the gain medium unit 120 to the outside may be adjusted through a direction and size of the entrance 123, respectively. The gain medium unit 120 includes the scattering gain medium 125 playing a role as a scatterer in the inside of the scattering cavity 121, so that light proceeds therein in all direction as in the existing non-resonant laser. However, all three-dimensional directions except the entrance 123 in a form of the scattering cavity 121 are fully blocked due to the scattering gain medium 125. Accordingly, very specific directionality may be assigned to laser light oscillated from the gain medium unit 120 to the outside. Accordingly, a direction of laser light oscillated from the gain medium unit 120 to the outside may be determined depending on a direction of the entrance 123 in the gain medium unit 120. Furthermore, as the size of the entrance 123 is reduced, higher spatial coherence can be implemented because the number of spatial modes which may be assigned to the entrance 123 is reduced. That is, a spatial coherence degree in the gain medium unit 120 may be determined depending on a size of the entrance 123 in the gain medium unit 120.

According to various embodiments, the non-resonant laser 100 including the scattering cavity 121 may supplement a disadvantage of the existing non-resonant laser and also do not lose its advantage. To this end, the scattering gain medium 125 is an opaque or transparent medium, and may be implemented in a powder, film, or ceramic form, for example. According to an embodiment, the gain medium unit 120 may further include a structure (e.g., 124 in FIG. 3) in which the scattering cavity 121 and the entrance 123 are provided. In such a case, the gain medium unit 120 may be implemented as the scattering gain medium 125 is applied on an inner surface of the scattering cavity 121 in the structure. In this case, in order for the scattering gain medium 125 to be applied on a three-dimensional surface of the structure, an additional structure or application technology may be necessary. For example, if the scattering gain medium 125 is implemented in a powder form, the scattering gain medium 125 may be mixed with at least one of a proper binder or solvent and implemented like paint, for example. Accordingly, the scattering gain medium 125 may be applied on an inner surface of the scattering cavity 121 in the structure. For another example, if the scattering gain medium 125 is implemented in a film form, the scattering gain medium 125 may be attached to the inner surface of the scattering cavity 121 in the structure. According to another embodiment, the gain medium unit 120 may be manufactured by etching the scattering cavity 121 and the entrance 123 in the scattering gain medium 125 of a solid matter having a ceramic form, that is, a ceramic material having a volume.

A mechanism of the gain medium unit 120 having the scattering cavity 121 has been schematically described, but a real scattering gain material 125 has reflectance greater than 0 and less than 1 with respect to emission light. Accordingly, a loss of energy may occur (in a small way) on the internal wall surface of the scattering cavity 121 on the inside of the scattering cavity 121 of the gain medium unit 120 with respect to most of the emission light. The loss is rapidly increased (the probability that the emission light escapes from the scattering cavity 121 is reduced, and the probability that the emission light will be absorbed by the internal wall surface of the scattering cavity 121 is increased) as the size of the scattering cavity 121 becomes greater than the size of the entrance 123. As a result, energy efficiency may be deteriorated. If the size of the scattering cavity 121 is smaller than the size of the entrance 123, the probability that pumping light escapes from the scattering cavity 121 through the entrance 123 is increased. This may also deteriorate energy efficiency.

Energy efficiency (or total efficiency) may be represented as the product of absorption efficiency (or pumping efficiency) and emission efficiency (or outcoupling efficiency). As illustrated in FIG. 4, as the size of the scattering cavity 121 becomes greater than the size of the entrance 123, energy efficiency may show a form that is gradually increased and then decreased after reaching a peak. If pieces of reflectance (denoted as $R_p$ and $R_{em}$, respectively) in pumping light and emission light of the scattering gain medium 125 are given, the size of the scattering cavity 121 may be estimated compared to the size of the entrance 123 that is theoretically most efficient. According to an embodiment, if the scattering cavity 121 having a spherical shape and the entrance 123 having a circular cross section are provided in the gain medium unit 120, the diameter of the scattering cavity 121 (i.e., a cavity diameter) is determined as $$\frac{1}{2}[Y_p Y_{em}(1 - Y_p Y_{em})]^{-\frac{1}{2}}$$

compared to the diameter of the entrance 123 (i.e., an aperture diameter) that is most efficient (i.e., the cavity diameter/aperture diameter). In such a case, theoretical energy efficiency may be $\gamma_p^2/(\gamma_p+\gamma_{em})^2$. In this case, the diameter of the entrance 123 and the diameter of the scattering cavity 121 may be defined on planes perpendicular to the axis that passes through the center of the entrance 123 and the center of the scattering cavity 121. In particular, the diameter of the scattering cavity 121 may include the center of the scattering cavity 121, may be defined on the center plane perpendicular to the axis, and may be $\gamma_p = \sqrt{1-R_p}$ and $\gamma_{em} = \sqrt{1-R_{em}}$. In the theoretical values, a pumping light loss according to a pumping condition in experiments, scattering within the scattering gain medium 125, the imperfection of the scattering cavity 121, etc were not considered. According to another embodiment, a three-dimensional form of the scattering cavity 121 may be implemented in various forms without being limited to a simple spherical shape, and different results may be obtained depending on a form of the scattering cavity 121. For example, the scattering cavity 121 may have a spherical shape, an ellipsoid, a crushed spherical shape, a crushed ellipsoid, a cylindrical shape, or a tilted cylindrical shape. According to another embodiment, a cross section form of the entrance 121 may be implemented in various forms without being limited to a simple circle, and different results may be obtained depending on a form of the scattering cavity 121. In other words, a cross section of at least one of the scattering cavity 121 or the entrance 123 may be a circle, an oval shape, a crushed circle, a crushed oval shape, or a polygon.

Figure 5:
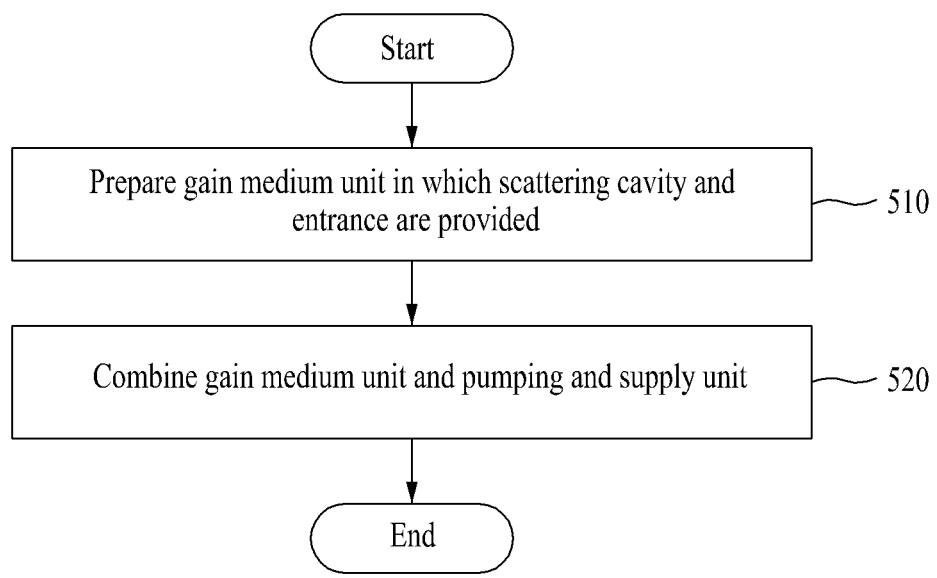
FIG. 5 is a flowchart illustrating a method of manufacturing the high-efficiency and directional non-resonant laser according to various embodiments.

FIG. 5 is a flowchart illustrating a method of manufacturing the high-efficiency and directional non-resonant laser 100 according to various embodiments.

Referring to FIG. 5, in step 510, the gain medium unit 120 may be prepared. The scattering cavity 121 and the entrance 123 communicating with the scattering cavity 121 may be provided in the gain medium unit 120. In this case, the scattering cavity 121 may have a spherical shape, an ellipsoid, a crushed spherical shape, a crushed ellipsoid, a cylindrical shape, or a tilted cylindrical shape. In this case, a cross section of at least one of the scattering cavity 121 and the entrance 123 may be a circle, an oval shape, a crushed circle, a crushed oval shape, or a polygon. According to an embodiment, the diameter of the entrance 123 and the diameter of the scattering cavity 121 may be defined on planes perpendicular to the axis that passes through the center of the entrance 123 and the center of the scattering cavity 121. For example, the diameter of the scattering cavity 121 may be increased as the diameter becomes distant from the entrance along the axis that passes through the center of the entrance 123 and the center of the scattering cavity 121. For example, if the scattering cavity 121 is a spherical shape, the diameter of the scattering cavity 121 may be a maximum on a center plane perpendicular to the axis at the center of the scattering cavity 121, and may be small as the diameter becomes distant from the center plane in the direction becoming distant from the entrance 123 along the axis. According to another embodiment, if the scattering cavity 121 is a cylindrical shape, the depth of the scattering cavity 121 may be defined along the axis perpendicular to the diameter of the scattering cavity 121. For example, the depth of the scattering cavity 121 may be twice greater than and ten times or less than the diameter of the scattering cavity 121. According to another embodiment, if the scattering cavity 121 is a tilted cylindrical shape, an inner surface of the scattering cavity 121 in the gain medium unit 120 may be sloped from the axis perpendicular to the diameter of the scattering cavity 121.

The gain medium unit 120 may be implemented to be excited by pumping light on the inside of the scattering cavity 121 and to output emission light through the entrance 123. In this case, the gain medium unit 120 may be implemented so that an internal wall surface of the scattering cavity 121 is formed of a scattering gain medium, so that the focusing of the pumping light and the amplification of the emission light through high reflectance can be simultaneously achieved.

According to various embodiments, a shape and size of each of the scattering cavity 121 and the entrance 123 may be determined so that desired energy efficiency can be achieved. For example, if the scattering cavity 121 having a spherical shape and the entrance 123 having a circular cross section are provided in the gain medium unit 120, the diameter of the scattering cavity 121 compared to the diameter of the entrance 123 that is most efficient may be determined as $$\frac{1}{2}[Y_p Y_{em}(1 - Y_p Y_{em})]^{-\frac{1}{2}}$$

(cavity diameter/aperture diameter). In such a case, theoretical energy efficiency may be $\gamma_p^2/(\gamma_p+\gamma_{em})^2$. In this case, the diameter of the entrance 123 and the diameter of the scattering cavity 121 may be defined on planes perpendicular to the axis that passes through the center of the entrance 123 and the center of the scattering cavity 121. In particular, the diameter of the scattering cavity 121 may include the center of the scattering cavity 121, may defined on the center plane perpendicular to the axis, and may $\gamma_p=\sqrt{1-R_p}$ and $\gamma_{em}=\sqrt{1-R_{em}}$.

According to an embodiment, after the structure in which the scattering cavity 121 and the entrance 123 are provided is prepared, the scattering gain medium 125 is applied on an inner surface of the scattering cavity 121 in the structure, so that the gain medium unit 120 may be prepared. For example, if the scattering gain medium 125 is implemented in a powder form, the scattering gain medium 125 may be mixed with at least one of a proper binder or solvent and implemented like paint, for example. Accordingly, scattering gain medium 125 may be applied on the inner surface of the scattering cavity 121 in the structure. For another example, if the scattering gain medium 125 is implemented in a film form, the scattering gain medium 125 may be attached on the inner surface of the scattering cavity 121 in the structure. According to another embodiment, the gain medium unit 120 may be prepared by etching the scattering cavity 121 and the entrance 123 in the scattering gain medium 125 of a solid matter having a ceramic form, that is, a ceramic material having a volume.

Next, in step 520, the pumping and supply unit 110 may be combined with the gain medium unit 120. Accordingly, the pumping and supply unit 110 may supply pumping light. According to an embodiment, the pumping and supply unit 110 may supply the pumping light on the outside of the gain medium unit 120. In this case, the pumping and supply unit 110 may supply the pumping light on the inside of the scattering cavity 121 through the entrance 123. According to another embodiment, the pumping and supply unit 110 may supply the pumping light on the inside of the gain medium unit 120. For example, the pumping and supply unit 110 may generate the pumping light by using at least one of electrical energy or chemical energy.

The "non-resonant laser 100 using the trapping scattering cavity 121" according to various embodiments may be implemented to have high efficiency and directionality by using the scattering cavity. Accordingly, the non-resonant laser 100 can solve fatal disadvantages of the existing non-resonant laser, that is, low energy efficiency and low directionality of light. According to various embodiments, it is expected that a laser in a new band can be manufactured by using the scattering gain media 125 which cannot be used due to difficult manufacturing in a transparent form. Furthermore, the present disclosure can be used as a technology capable of improving performance of the existing laser in terms that a laser can be easily manufactured without a difficult crystallization process even in the case of the existing scattering gain media 125.

The high-efficiency and directional non-resonant laser 100 according to various embodiments may include the gain medium unit 120 in which the scattering cavity 121 and the entrance 123 communicating with the scattering cavity 121 are provided, and the pumping and supply unit 110 supplying pumping light to the inside of the scattering cavity 121.

According to various embodiments, the gain medium unit 120 may be excited by the pumping light on the inside of the scattering cavity 121, and may output emission light through the entrance 123.

According to various embodiments, the gain medium unit 120 may weaken pumping light while reflecting the pumping light on the inside of the scattering cavity 121, and may amplify emission light while reflecting the emission light on the inside of the scattering cavity 121.

According to an embodiment, the gain medium unit 120 may include the structure in which the scattering cavity 121 and the entrance 123 are provided, and the scattering gain medium 125 applied on an inner surface of the scattering cavity 121 in the structure. For example, the scattering gain medium 125 may be implemented in a powder form, may be mixed with at least one of a binder or a solvent, and may be applied on the inner surface of the scattering cavity 121 in the structure. For another example, the scattering gain medium 125 may be implemented in a film form, and may be attached to the inner surface of the scattering cavity 121 in the structure.

According to another embodiment, the gain medium unit 120 may be manufactured by etching the scattering cavity 121 and the entrance 123 in the scattering gain medium 125 of a solid matter having a volume.

According to various embodiments, the diameter of the entrance 123 and the diameter of the scattering cavity 121 may be defined on planes perpendicular to an axis that passes through the center of the entrance 123 and the center of the scattering cavity 121.

According to various embodiments, the diameter of the scattering cavity 121 may be determined as $$\frac{1}{2}[Y_p Y_{em}(1 - Y_p Y_{em})]^{-\frac{1}{2}}$$

compared to the diameter of the entrance 123. In this case, $\gamma_p = \sqrt{1-R_p}$ and $\gamma_{em} = \sqrt{1-R_{em}}$. $R_p$ may indicate reflectance of pumping light of the gain medium unit 120, and $R_{em}$ may indicate reflectance of emission light of the gain medium unit 120.

According to various embodiments, energy efficiency in the gain medium unit 120 according to the diameter of the scattering cavity 121 compared to the diameter of the entrance 123 may be $\gamma_p^2/(\gamma_p+\gamma_{em})^2$.

According to various embodiments, the diameter of the scattering cavity 121 may be increased as the diameter becomes distant from the entrance 123 along the axis.

According to various embodiments, the diameter of the scattering cavity 121 may be a maximum on a center plane perpendicular to the axis at the center of the scattering cavity 121, and may be small as the diameter becomes distant from the center plane along the axis in a direction becoming distant from the entrance 123.

According to various embodiments, a cross section of at least one of the scattering cavity 121 or the entrance 123 may be a circle, an oval shape, a crushed circle, a crushed oval shape, or a polygon.

According to various embodiments, the scattering cavity 121 may have a spherical shape, an ellipsoid, a crushed spherical shape, a crushed ellipsoid, a cylindrical shape, or a tilted cylindrical shape.

According to various embodiments, the pumping and supply unit 110 may supply pumping light to the inside of the scattering cavity 121 through the entrance 123 on the outside of the gain medium unit 120.

According to various embodiments, reflectance of emission light of the gain medium unit 120 may be greater than 0 and less than 1.

A method of manufacturing the high-efficiency and directional non-resonant laser 100 according to various embodiments may include a step (step 510) of preparing the gain medium unit 120 in which the scattering cavity 121 and the entrance 123 are provided, and a step (step 520) of combining the gain medium unit 120 and the pumping and supply unit 110.

According to an embodiment, the step (step 510) of preparing the gain medium unit 120 may include a step of preparing the structure in which the scattering cavity 121 and the entrance 123 are provided, and a step of applying the scattering gain medium 125 on an inner surface of the scattering cavity 121 in the structure. For example, the scattering gain medium 125 may be implemented in a powder form, may be mixed with at least one of a binder or a solvent, and may be applied on the inner surface of the scattering cavity 121 in the structure. For another example, the scattering gain medium 125 may be implemented in a film form, and may be attached to the inner surface of the scattering cavity 121 in the structure.

According to another embodiment, the step (step 510) of preparing the gain medium unit 120 may include a step of etching the scattering cavity 121 and the entrance 123 in the scattering gain medium 125 of a solid matter having a volume.

According to various embodiments, the diameter of the entrance 123 and the diameter of the scattering cavity 121 may be defined on planes perpendicular to an axis that passes through the center of the entrance 123 and the center of the scattering cavity 121.

According to various embodiments, the diameter of the scattering cavity 121 compared to the diameter of the entrance 123 may be $$\frac{1}{2}[Y_p Y_{em}(1 - Y_p Y_{em})]^{-\frac{1}{2}}.$$

In this case, $\gamma_p = \sqrt{1-R_p}$ and $\gamma_{em} = \sqrt{1-R_{em}}$. $R_p$ may indicate reflectance of pumping light of the gain medium unit 120, and $R_{em}$ may indicate reflectance of emission light of the gain medium unit 120.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding elements regardless of its sequence or importance, and are used to only distinguish one element from the other element and do not limit corresponding elements. When it is described that one (e.g., a first) element is "(functionally or communicatively) connected to" or "coupled with" the other (e.g., a second) element, one element may be directly connected to the other element or may be connected to the other element through another element (e.g., a third element).

According to various embodiments, each of the described elements may include a single entity or a plurality of entities. According to various embodiments, at least one element or step of the aforementioned elements may be omitted or at least one element or step may be added. Alternatively or additionally, a plurality of elements may be integrated into a single element. In such a case, the integrated element may perform a function, performed by a corresponding one of the plurality of elements before at least one function of each of the plurality of elements is integrated, identically or similarly.

The invention claimed is:
1. A high-efficiency and directional non-resonant laser, comprising:
   a gain medium unit in which a scattering cavity and an entrance communicating with the scattering cavity are provided; and
   a pumping and supply unit configured to supply pumping light to an inside of the scattering cavity,
   wherein the gain medium unit is excited by the pumping light on the inside of the scattering cavity and outputs emission light through the entrance,
   wherein a diameter of the entrance and a diameter of the scattering cavity are defined on planes perpendicular to an axis passing through a center of the entrance and a center of the scattering cavity, and wherein the diameter of the scattering cavity is increased as the diameter becomes distant from the entrance along the axis.

2. The non-resonant laser of claim 1, wherein:
the gain medium unit weakens the pumping light while reflecting the pumping light on the inside of the scattering cavity, and amplifies the emission light while reflecting the emission light on the inside of the scattering cavity.

3. The non-resonant laser of claim 1, wherein the gain medium unit comprises:
a structure in which the scattering cavity and the entrance are provided; and
a scattering gain medium applied on an inner surface of the scattering cavity in the structure.

4. The non-resonant laser of claim 1, wherein the gain medium unit is manufactured by etching the scattering cavity and the entrance in the scattering gain medium of a solid matter having a volume.

5. The non-resonant laser of claim 3, wherein the scattering gain medium is implemented in a powder form, mixed with at least one of a binder or a solvent, and applied on the inner surface of the scattering cavity in the structure.

6. The non-resonant laser of claim 3, wherein the scattering gain medium is implemented in a film form and attached to the inner surface of the scattering cavity in the structure.

7. The non-resonant laser of claim 1, wherein the diameter of the scattering cavity is a maximum on a center plane perpendicular to the axis at the center of the scattering cavity, and is reduced as the diameter becomes distant from the center plane in a direction becoming distant from the entrance along the axis.

8. The non-resonant laser of claim 1, wherein a cross section of at least one of the scattering cavity or the entrance is a circle, an oval shape, a crushed circle, a crushed oval shape, or a polygon.

9. The non-resonant laser of claim 1, wherein the scattering cavity has a spherical shape, an ellipsoid, a crushed spherical shape, a crushed ellipsoid, a cylindrical shape, or a tilted cylindrical shape.

10. The non-resonant laser of claim 1, wherein the pumping and supply unit supplies the pumping light to the inside of the scattering cavity through the entrance on an outside of the gain medium unit.

11. The non-resonant laser of claim 1, wherein reflectance of the emission light of the gain medium unit is greater than 0 and less than 1.

12. A high-efficiency and directional non-resonant laser, comprising:
a gain medium unit in which a scattering cavity and an entrance communicating with the scattering cavity are provided; and
a pumping and supply unit configured to supply pumping light to an inside of the scattering cavity,
wherein the gain medium unit is excited by the pumping light on the inside of the scattering cavity and outputs emission light through the entrance,
wherein a diameter of the entrance and a diameter of the scattering cavity are defined on planes perpendicular to an axis passing through a center of the entrance and a center of the scattering cavity,
wherein the diameter of the scattering cavity compared to the diameter of the entrance is determined as $$\frac{1}{2}[Y_p Y_{em}(1 - Y_p Y_{em})]^{-\frac{1}{2}},$$

and
wherein $\gamma_p = \sqrt{1-R_p}$ and $\gamma_{em} = \sqrt{1-R_{em}}$, $\gamma_p$ indicates the diameter of the scattering cavity and $\gamma_{em}$ indicates the diameter of the entrance, $R_p$ indicates reflectance of the pumping light of the gain medium unit, and $R_{em}$ indicates reflectance of the emission light of the gain medium unit.

13. The non-resonant laser of claim 12 wherein energy efficiency in the gain medium unit according to the diameter of the scattering cavity compared to the diameter of the entrance is $\gamma_p^2/(\gamma_p + \gamma_{em})^2$.

14. A method of manufacturing a non-resonant laser,
the non-resonant laser being a high-efficiency and directional non-resonant laser, comprising
a gain medium unit in which a scattering cavity and an entrance communicating with the scattering cavity are provided; and
a pumping and supply unit configured to supply pumping light to an inside of the scattering cavity,
the gain medium unit being excited by the pumping light on the inside of the scattering cavity and outputs emission light through the entrance,
the method comprising:
preparing the gain medium unit in which the scattering cavity and the entrance are provided; and
combining the gain medium unit and the pumping and supply unit,
wherein a diameter of the entrance and a diameter of the scattering cavity are defined on planes perpendicular to an axis passing through a center of the entrance and a center of the scattering cavity,
wherein the diameter of the scattering cavity compared to the diameter of and the entrance is determined as $$\frac{1}{2}[Y_p Y_{em}(1 - Y_p Y_{em})]^{-\frac{1}{2}},$$

and
wherein $\gamma_p = \sqrt{1-R_p}$ and $\gamma_{em} = \sqrt{1-R_{em}}$, $\gamma_p$ indicates the diameter of the scattering cavity and $\gamma_{em}$ indicates the diameter of the entrance, $R_p$ indicates reflectance of the pumping light of the gain medium unit, and $R_{em}$ indicates reflectance of the emission light of the gain medium unit.

15. The method of claim 14, wherein the preparing of the gain medium unit comprises:
preparing a structure in which the scattering cavity and the entrance are provided; and
applying a scattering gain medium on an inner surface of the scattering cavity in the structure.

16. The method of claim 14, wherein the preparing of the gain medium unit comprises etching the scattering cavity and the entrance in the scattering gain medium of a solid matter having a volume.

17. The method of claim 15, wherein the scattering gain medium is implemented in a powder form, mixed with at least one of a binder or a solvent, and applied on the inner surface of the scattering cavity in the structure.

18. The method of claim 15, wherein the scattering gain medium is implemented in a film form and attached to the inner surface of the scattering cavity in the structure.

\* \* \* \* \*